United States Patent
Vetter

(10) Patent No.: US 11,606,663 B2
(45) Date of Patent: Mar. 14, 2023

(54) SYSTEM FOR AND METHOD OF CONTROLLING A THREE-DIMENSIONAL AUDIO ENGINE

(71) Applicant: AUDIBLE REALITY INC., Montreal (CA)

(72) Inventor: Lasse Vetter, Hamburg (DE)

(73) Assignee: AUDIBLE REALITY INC., Montreal (CA)

( * ) Notice: Subject to any disclaimer, the term of this patent is extended or adjusted under 35 U.S.C. 154(b) by 40 days.

(21) Appl. No.: 17/270,985

(22) PCT Filed: Aug. 27, 2019

(86) PCT No.: PCT/IB2019/057222
§ 371 (c)(1),
(2) Date: Feb. 24, 2021

(87) PCT Pub. No.: WO2020/044244
PCT Pub. Date: Mar. 5, 2020

(65) Prior Publication Data
US 2021/0329403 A1 Oct. 21, 2021

Related U.S. Application Data

(60) Provisional application No. 62/724,141, filed on Aug. 29, 2018.

(51) Int. Cl.
*G06F 3/16* (2006.01)
*H04S 7/00* (2006.01)

(52) U.S. Cl.
CPC .............. *H04S 7/304* (2013.01); *G06F 3/165* (2013.01); *H04S 2400/01* (2013.01)

(58) Field of Classification Search
CPC ....... H04S 7/304; H04S 2400/01; G06F 3/165
See application file for complete search history.

(56) References Cited

U.S. PATENT DOCUMENTS

| 6,027,428 A | 2/2000 | Thomas et al. |
| 6,741,706 B1 | 5/2004 | McGrath et al. |
| (Continued) | | |

FOREIGN PATENT DOCUMENTS

| CN | 102694764 A | 9/2012 |
| CN | 104021373 A | 9/2014 |
| (Continued) | | |

OTHER PUBLICATIONS

International Search Report and Written Opinion dated Mar. 1, 2018 in corresponding International patent application No. PCT/IB2017/056471.

(Continued)

*Primary Examiner* — Joseph Saunders, Jr.
(74) *Attorney, Agent, or Firm* — BCF LLP

(57) ABSTRACT

A system for and a method of controlling generation of a 3D audio stream are disclosed. The method comprises accessing an audio stream; determining a value of a feature associated with the audio stream; selecting one or more 3D control parameters from a set of 3D control parameters, the selecting being based on the value of the feature associated with the audio stream; and generating the 3D audio stream based on the selected one or more 3D control parameters. In some embodiments, the feature is a metric associated with a frequency distribution of correlations of the audio stream.

20 Claims, 13 Drawing Sheets

(56) References Cited

U.S. PATENT DOCUMENTS

| | | | |
|---|---|---|---|
| 8,619,998 | B2 | 12/2013 | Walsh et al. |
| 9,094,771 | B2 | 7/2015 | Tsingos et al. |
| 9,172,901 | B2 | 10/2015 | Chabanne et al. |
| 9,654,869 | B2 | 5/2017 | Reiss et al. |
| 9,979,499 | B2 | 5/2018 | Oldfield et al. |
| 10,014,002 | B2 | 7/2018 | Koretzky et al. |
| 10,015,616 | B2 | 7/2018 | Luo et al. |
| 2005/0271215 | A1 | 12/2005 | Kulkarni |
| 2008/0298610 | A1 | 12/2008 | Virolainen et al. |
| 2010/0076577 | A1 | 3/2010 | Lee et al. |
| 2012/0213375 | A1 | 8/2012 | Mahabub et al. |
| 2014/0185812 | A1 | 7/2014 | Van Achte et al. |
| 2014/0185844 | A1 | 7/2014 | Haurais et al. |
| 2014/0219455 | A1 | 8/2014 | Peters et al. |
| 2014/0355796 | A1 | 12/2014 | Xiang et al. |
| 2015/0293655 | A1 | 10/2015 | Tan |
| 2017/0223478 | A1 | 8/2017 | Jot et al. |

FOREIGN PATENT DOCUMENTS

| | | | |
|---|---|---|---|
| EP | 1613127 | A1 | 1/2006 |
| EP | 2873254 | A1 | 5/2015 |
| WO | 99/49574 | A1 | 9/1999 |
| WO | 2012088336 | A2 | 6/2012 |
| WO | 2013167884 | A1 | 11/2013 |
| WO | 2014/014891 | A1 | 1/2014 |
| WO | 2014159376 | A1 | 10/2014 |
| WO | 2014194005 | A1 | 12/2014 |
| WO | 2015035492 | A1 | 3/2015 |
| WO | 2015134658 | A1 | 9/2015 |
| WO | 2015147619 | A1 | 10/2015 |
| WO | 201873759 | A1 | 4/2018 |
| WO | 2018096036 | A1 | 5/2018 |

OTHER PUBLICATIONS

Siltanen et al., "Rays or Waves? Understanding the Strengths and Weaknesses of Computational Room Acoustics Modeling Techniques", Proceedings of the International Symposium of Room Acoustics, ISRA 2010, Melbourne, Australia, Aug. 29-31, 2010, 6 pages.

Rober et al., "Ray Acoutics Using Computer Graphics Technology", Proceeding of the 10th International Conference on Digital Audio Effects (DAFx-07), Bordeaux, France, Sep. 10-15, 2007, 8 pages.

Kiminki, "Sound Propagation Theory for Linear Ray Acoustic Modelling", Master's Thesis, Helsinki University of Technology, Department of Computer Science and Engineering, Telecommunications Software and Multimedia Laboratory, Mar. 7, 2005, 114 pages.

Begault, D.R., "3-D Sound for Virtual Reality and Multimedia", National Aeronautics and Space Administration, NASA/TM-2000-209606, Aug. 2000, 246 pages.

Blauert, J., "Communication Acoustics", Springer—Verlag Berlin Heidelberg, 2005, Chapters 1 and 4, 386 pages.

Vorlander, M., "Auralization of spaces", Physics Today, American Institute of Physics, S-0031-9228-0906-020-7, Jun. 2009, pp. 35-40.

Everest, F.A. et al., "Master Handbook of Acoustics, Fifth Edition", The McGraw-Hill Companies, Inc., 2009, Chapters 18 and 26, 529 pages.

Melchior, F., "The theory and practice of generating improved headphone experiences, Part II", BBC R&D, 1998, 74 pages.

European Search Report with regard to the counterpart EP Patent Application No. 17861420.2 dated Jun. 25, 2019.

Bernschutz, "A Spherical Far Field HRIR/HRTF Compilation of the Neumann KU100", AIA-DAGA 2013 Merano, Proceedings of the International Conference on Acoustics, pp. 592-595.

International Search Report and Written Opinion with regard to PCT/IB2019/057222 dated Dec. 23, 2019.

English Abstract for CN 102694764 retrieved on Espacenet on Feb. 19, 2021.

English Abstract for CN 104021373 retrieved on Espacenet on Feb. 19, 2021.

Office Action with regard to the U.S. Appl. No. 16/388,146 dated Dec. 20, 2019.

Office Action with regard to the U.S. Appl. No. 16/388,146 dated Apr. 8, 2020.

Office Action with regard to the CN Patent Application No. 201780078834.6 dated Aug. 31, 2020.

Communication pursuant to Article 94(3) EPC with regard to the counterpart EP Patent Application No. 17861420.2 dated Jul. 15, 2021.

Sorensen, "Waves And Rays—Acoustic Fields", May 23, 2013, XP055822573, Retrieved from the Internet URL: https://www.acousticfields com/waves-and-rays/? nab=1 &utm_referrer=https://www.google.de/, 12 pages.

SYSTEM FOR AND METHOD OF CONTROLLING A THREE-DIMENSIONAL AUDIO ENGINE

CROSS-REFERENCE TO RELATED APPLICATIONS

The present application is a National Stage of International Application No. PCT/IB2019/057222, filed on Aug. 27, 2019, which claims priority to U.S. Provisional Patent Application No. 62/724,141, filed Aug. 29, 2018, the entirety of each of which is incorporated herein by reference. The present application also relates to PCT Application PCT/IB2017/056471 filed on Oct. 18, 2017 which claims priority to U.S. Provisional Patent Application No. 62/410,132 filed on Oct. 19, 2016, the entire disclosure of which are incorporated herein by reference in those jurisdictions that allow incorporation by reference.

FIELD

The present technology relates to systems and methods of controlling a three-dimensional (3D) audio engine generating an audio image. In particular, the systems and methods allow selecting 3D control parameters relied upon for the creation of an audio image for use in rendering 3D audio to a listener.

BACKGROUND

Existing technologies typically rely on spatial domain convolution of sound waves using head-related transfer functions (HRTFs) to transform sound waves so as to mimic natural sounds waves which emanate from a point of a three-dimensional space. Such technics allow, within certain limits, tricking the brain of the listener to pretend to place different sound sources in different three-dimensional locations upon hearing audio streams, even though the audio streams are produced from only two speakers (such as headphones or loudspeakers).

Even though current technologies, such as the ones detailed above, may allow bringing a listener a step closer to an immersive experience, they still present at least certain deficiencies. Such deficiencies include, amongst other things, controlling generation of 3D audio stream based on a content of an original, non-3D audio stream (such as a stereo or mono audio stream). Improvements are therefore desirable.

SUMMARY

Embodiments of the present technology have been developed based on developers' appreciation of shortcomings associated with the prior art.

In one aspect, various implementations of the present technology provide a method of controlling generation of a 3D audio stream, the method comprising:
accessing an audio stream;
determining a value of a feature associated with the audio stream;
selecting one or more 3D control parameters from a set of 3D control parameters, the selecting being based on the value of the feature associated with the audio stream; and
generating the 3D audio stream based on the selected one or more 3D control parameters.

In another aspect, various implementations of the present technology provide a method of controlling generation of a 3D audio stream, the method comprising:
accessing an audio stream;
determining a value of a feature associated with the audio stream;
selecting at least one of a 3D preset from a set of 3D presets and/or a 3D production from a set of 3D productions, based on the value of the feature; and
generating the 3D audio stream based on the at least one of the selected 3D preset and/or the selected 3D production.

In other aspects, various implementations of the present technology provide a non-transitory computer-readable medium storing program instructions for controlling generation of a 3D audio stream, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for controlling generation of a 3D audio stream, the program instructions being executable by the at least one processor of the electronic device to carry out one or more of the above-recited methods.

In the context of the present specification, unless expressly provided otherwise, a computer system may refer, but is not limited to, an "electronic device", a "mobile device", an "audio processing device", "headphones", a "headset", a "VR headset device", an "AR headset device", a "system", a "computer-based system" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
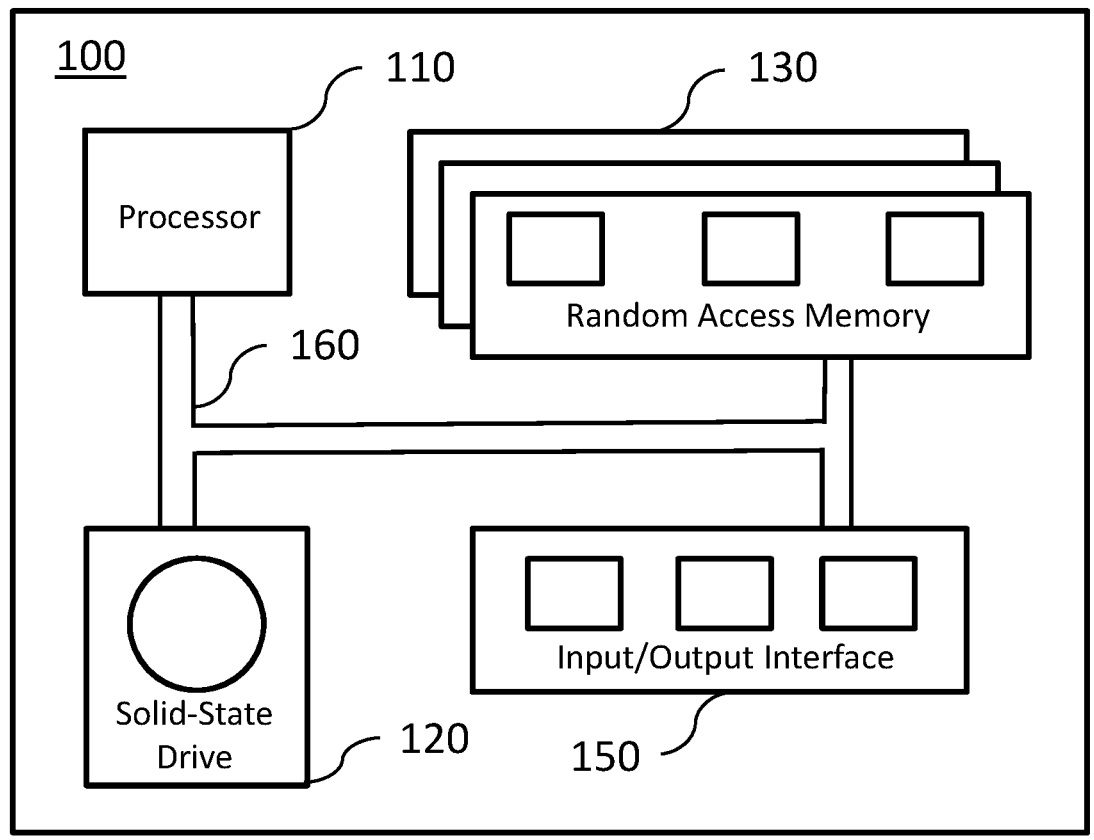
FIG. 1 is a diagram of a computing environment in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", a "controller", an "encoder", a "sound-field positioner", a "renderer", a "decoder", a "filter", a "localisation convolution engine", a "mixer" or a "dynamic processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term "processor", "controller", "encoder", "sound-field positioner", "renderer", "decoder", "filter", "localisation convolution engine", "mixer" or "dynamic processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Throughout the present disclosure, reference is made to audio image, audio stream, positional impulse response and virtual wave front. It should be understood that such reference is made for the purpose of illustration and is intended to be exemplary of the present technology.

Audio image: an audio signal or a combination of audio signals generated in such a way that, upon being listened to by a listener, a perception of a volumetric audio envelope similar to what the listener would experience in real life is recreated. While conventional audio systems, such as headphones, deliver an audio experience which is limited to being perceived between the listener's ears, an audio image, upon being rendered to the listener, may be perceived as a sound experience expanded to be outside and/or surrounding the head of the listener. This results in a more vibrant, compelling and life-like experience for the listener. In some embodiments, an audio image may be referred to as an holographic audio image and/or a three-dimensional audio image so as to convey a notion of volumetric envelope to be experienced by the listener. In some embodiments, the audio image may be defined by a combination of at least three virtual wave fronts. In some embodiments, the audio image may be defined by a combination of at least three virtual wave fronts generated from an audio stream.

Audio stream: a stream of audio information which may comprise one or more audio channels. An audio stream may be embedded as a digital audio signal or an analogic audio signal. In some embodiments, the audio stream may take the form a computer audio file of a predefined size (e.g., in duration) or a continuous stream of audio information (e.g., a continuous stream streamed from an audio source). As an example, the audio stream may take the form of an uncompressed audio file (e.g., a ".wav" file) or of a compressed audio file (e.g., an ".mp3" file). In some embodiments, the audio stream may comprise a single audio channel (i.e., a mono audio stream). In some other embodiments the audio stream may comprise two audio channels (i.e., a stereo audio stream) or more than two audio channels (e.g., a 5.1. audio format, a 7.1 audio format, MPEG multichannel, etc).

Positional impulse response: an output of a dynamic system when presented with a brief input signal (i.e., the impulse). In some embodiments, an impulse response describes a reaction of a system (e.g., an acoustic space) in response to some external change. In some embodiments, the impulse response enables capturing one or more characteristics of an acoustic space. In some embodiments of the present technology, impulses responses are associated with corresponding positions of an acoustic space, hence the name "positional impulse response" which may also be referred to as "PIR". Such acoustic space may be a real-life space (e.g., a small recording room, a large concert hall) or a virtual space (e.g., an acoustic sphere to be "recreated" around a head of a listener). The positional impulse responses may define a package or a set of positional impulse responses defining acoustic characteristics of the acoustic space. In some embodiments, the positional impulse responses are associated with an equipment that passes signal. The number of positional impulse responses may vary and is not limitative. The positional impulse responses may take multiple forms, for example, but without being limitative, a signal in the time domain or a signal in the frequency domain. In some embodiments, positions of each one of the positional impulse responses may be modified in real-time (e.g., based on commands of a real-time controller) or according to predefined settings (e.g., setting embedded in control data). In some embodiments, the positional impulse responses may be utilized to be convolved with an audio signal and/or an audio stream.

Virtual wave front: a virtual wave front may be defined as a virtual surface representing corresponding points of a wave that vibrates in unison. When identical waves having a common origin travel through a homogeneous medium, the corresponding crests and troughs at any instant are in phase; i.e., they have completed identical fractions of their cyclic motion, and any surface drawn through all the points of the same phase will constitute a wave front. An exemplary representation of a virtual wave front is provided in FIG. 15. In some embodiments, the virtual surface is embedded in an audio signal or a combination of audio signals to be rendered to a listener. In some embodiments, a combination of the virtual surfaces defines an audio image which, upon being rendered to the listener, is perceived as a sound experience expanded to be outside and/or surrounding the head of the listener. In some embodiments, reference is made to "virtual" wave fronts to illustrate that the wave fronts are "artificially" created in such a way that, upon being rendered to a listener, they are perceived in a similar way to "real" wave fronts in a real acoustic environment. In some embodiments, a virtual wave front may be referred to as a "VWF". In some embodiments, wherein the virtual wave fronts are to be rendered on a stereophonic setting (e.g., headphones or two loudspeakers), a virtual wave front may comprise a left component (i.e., a left virtual wave front or VWF L) and a right component (i.e., a right virtual wave front or VWF R).

With these fundamentals in place, we will now consider some non-limiting examples to illustrate various implementations of aspects of the present technology.

Figure 2:
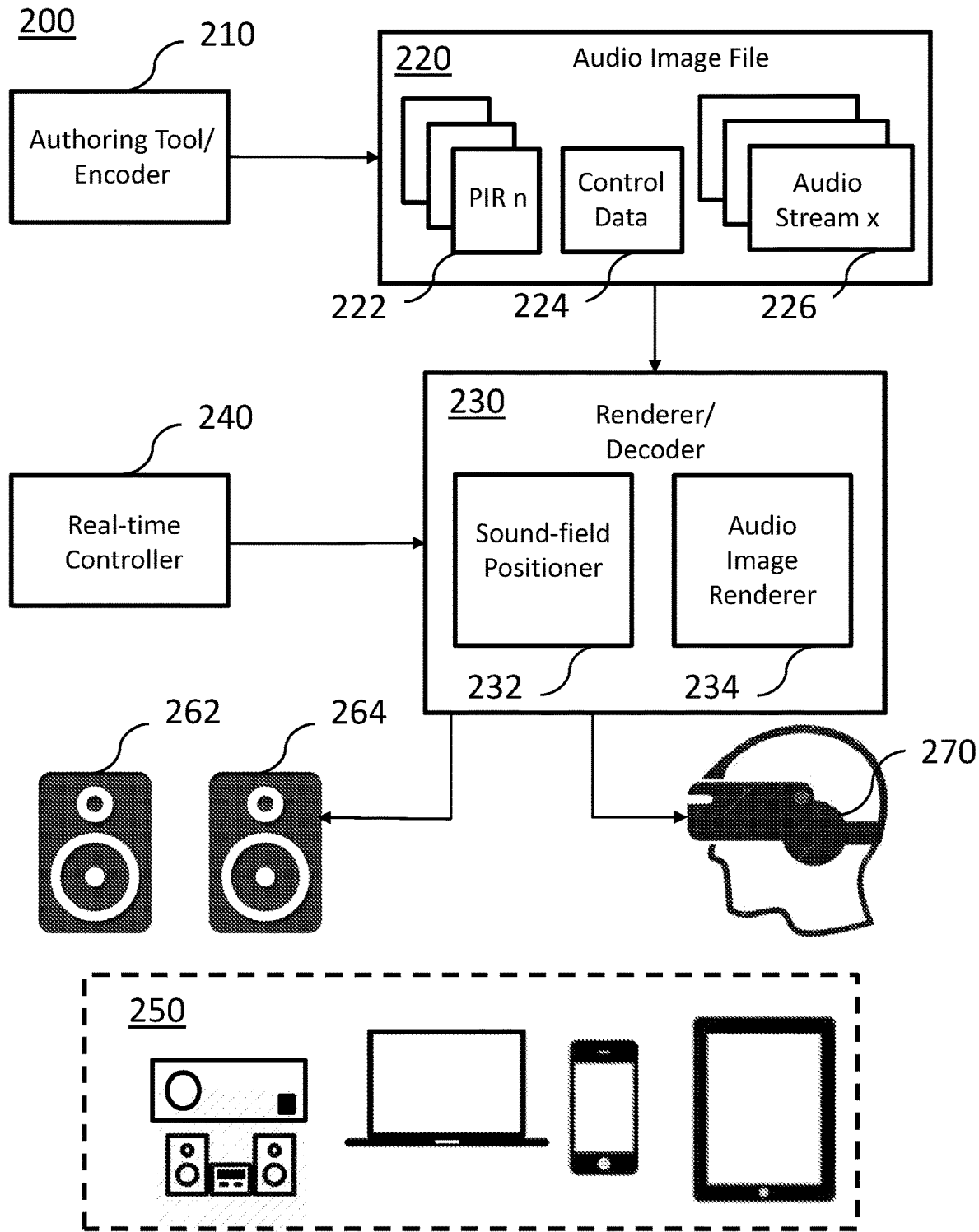
FIG. 2 is a diagram of an audio system for creating and rendering an audio image in accordance with an embodiment of the present technology.

FIG. 1 illustrates a diagram of a computing environment 100 in accordance with an embodiment of the present technology is shown. In some embodiments, the computing environment 100 may be implemented by the renderer 230, for example, but without being limited to, embodiments wherein the renderer 230 comprises a sound-field positioner 232 and/or an audio image renderer 234 as illustrated in FIG. 2. In some embodiments, the computing environment 100 comprises various hardware components including one or more single or multi-core processors collectively represented by a processor 110, a solid-state drive 120, a random access memory 130 and an input/output interface 150. The computing environment 100 may be a computer specifically designed for installation into an electronic device. In some alternative embodiments, the computing environment 100 may be a generic computer system adapted to meet certain requirements, such as, but not limited to, performance requirements. The computing environment 100 may be an "electronic device", a "controller", a "mobile device", an "audio processing device", "headphones", a "headset", a "VR headset device", a "AR headset device", a "system", a "computer-based system", a "controller", an "encoder", a "sound-field positioner", a "renderer", a "decoder", a "filter", a "localisation convolution engine", a "mixer", a "dynamic processor" and/or any combination thereof appropriate to the relevant task at hand. In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may be coupled to, for example, but without being limitative, headphones, earbuds, a set of loudspeakers, a headset, a VR headset, a AR headset and/or an audio processing unit (e.g., a recorder, a mixer).

According to implementations of the present technology, the solid-state drive 120 stores program instructions suitable for being loaded into the random access memory 130 and executed by the processor 110 for generating an audio image. For example, the program instructions may be part of a library or an application.

In some embodiments, the computing environment 100 may be configured so as to generate an audio image in accordance with the present technology described in the following paragraphs. In some other embodiments, the computing environment 100 may be configured so as to act as one or more of an "encoder", a "sound-field positioner", a "renderer", a "decoder", a "controller", a "real-time controller", a "filter", a "localisation convolution engine", a "mixer", a "dynamic processor" and/or any combination thereof appropriate to the relevant task at hand.

Referring to FIG. 2, there is shown an audio system 200 for creating and rendering an audio image. The audio system 200 comprises an authoring tool 210 for creating an audio image file 220, a renderer 230 associated with a real-time controller 240 for rendering the audio image file to a listener via loudspeakers 262, 264 and/or headphones 270 (which may also be referred to as a VR headset 270 and/or an AR headset 270).

In some embodiments, the authoring tool 210 comprises an encoder. In some embodiments, the authoring tool 210 may also be referred to as an encoder. In the illustrated embodiment, the audio image file 220 is created by the authoring tool 210 and comprises multiple positional impulse responses 222 (PIRs), control data 224 and one or more audio streams 226. Each one of the PIRs is referred to as PIR n, wherein n is an integer. Each one of the one or more audio streams 226, may be referred to as audio stream x, wherein x is an integer. In some embodiments, the PIRs 222 comprises three PIRs, namely $PIR_1$, $PIR_2$ and $PIR_3$. In some other embodiments, the PIR 222 comprises more than three PIRs.

In some embodiments, the authoring tool 210 allows creating audio image files such as the audio image file 220. Once created, the audio image files may then be stored and/or transmitted to a device for real-time or future rendering. In some embodiments, the authoring tool 210 comprises an input interface configured to access one or more audio streams and control data. The control data may comprise positions of impulse responses, the positions allowing positioning impulse responses in a three-dimensional space (such as, but not limited to, a sphere). In some embodiments, the authoring tool 210 comprises an encoder which is configured to encode, for example, in a predefined file format, the one or more audio streams and the control data so that an audio image renderer (such as, but not limited to, the audio image renderer 230) may decode the audio image file to generate an audio image based on the one or more audio streams and positional impulse responses, positions of the positional impulse responses being defined by the control data of the audio image file.

The renderer 230 may be configured to access and/or receive audio image files such as the audio image file 220. In other embodiments, the renderer 230 may independently access one or more audio streams, control data and positional impulse responses. In some embodiments, the renderer 230 may have access to a repository of control data and/or positional impulse responses and receive an audio image file solely comprising one or more audio streams. Conversely, the renderer 230 may have access to one or more audio streams and receive control data and/or positional impulse responses from an external source (such as, but not limited to, a remote server). In the illustrated embodiment, the renderer 230 comprises a sound-field positioner 232 and an audio image renderer 234. In some embodiments, the renderer 230 may also be referred to as a decoder.

The sound-field positioner 232 may be controlled by a real-time controller 240. Even though reference is made to a real-time controller 240, it should be understood that the control of the sound-field positioner 232 does not require to occur in real-time. As such, in various embodiments of the present technology, the sound-field positioner 232 may be controlled by various types of controllers, whether real-time or not. In some embodiments wherein positions of positional impulse responses and their respective positions define a sphere, the sound-field positioner 232 may be referred to as a spherical sound-field positioner. In some embodiments, the sound-field positioner 232 allows associating positional impulse responses with positions and control of such positions of the positional impulse responses as it will be further detailed below in connection with the description of FIG. 3.

The audio image renderer 234 may decode an audio image file such as the audio image file 220 to render an audio image. In some embodiments, the audio image renderer 234 may also be referred to as a three-dimensional audio experiential renderer or three-dimensional audio engine. In some embodiments, the audio image is rendered based on an audio stream and positional impulse responses which positions are determined and/or controlled by the sound-field positioner 232. In some embodiments, the audio image is generated by combining multiple virtual wave fronts, each one of the multiple virtual wave fronts being generated by the audio image renderer 234. In some embodiments, the multiple virtual wave fronts are being generated based on the audio stream and positional impulse responses as it will be further detailed below in connection with the description of FIGS. 7 to 14. In some alternative embodiments, the multiple virtual wave fronts are being generated based on acoustic rendering and/or binaural (also referred to as perceptual) rendering. In some embodiments, the audio image renderer 234 may be configured for acoustic rendering and/or binaural (also referred to as perceptual) rendering. The acoustic rendering may comprise, in some embodiments, rendering direct sounds, rendering early reflections and/or late reflections/reverberation. Examples of acoustic rendering and/or binaural rendering are further discussed in other paragraphs of the present document.

In some embodiments, the audio image renderer 234 mixes the virtual wave fronts and outputs a m-channel audio output so as to render the audio image to a listener. In the embodiments illustrated at FIG. 2, the outputted channel is a 2-channel audio output (i.e., a stereo audio output). In some embodiments, the outputted channel is a 2-channel audio output which may also be referred to as a rendered 3D experiential 2-channel audio output.

FIG. 2 also illustrates one or more devices 250 that may be used to encode or decode an audio image file in accordance with the present technology. The one or more devices 250 may be, for example, but without being limitative, an audio system, a mobile device, a smart phone, a tablet, a computer, a dedicated system, a headset, headphones, a communication system, a VR headset and an AR headset. Those examples are provided for the sake of exemplifying embodiments of the present technology and should therefore not be construed as being limitative. In some embodiments, the one or more devices 250 may comprise components similar to those of the computing environment 100 depicted at FIG. 1. In some embodiments, each one of the one or more devices 250 may comprise the authoring tool 210, the renderer 230 and/or the real-time controller 240. In some other embodiments, a first device may comprise the authoring tool 210 which is used to generate the audio image file 220. The audio image file 220 may then be transmitted (e.g., via a communication network) to a second device which comprises the renderer 230 (and optionally the real-time controller 240). The renderer 230 of the second device may then output an audio image based on the received audio image file 220. As a person skilled in the art of the present technology will appreciate, the device on which the authoring tool 210, the renderer 230 and the real-time controller 240 are executed is not limitative and multiple variations may be envisioned without departing from the scope of the present technology.

As can be shown in FIG. 2, the audio image is rendered to a listener via the loudspeakers 262, 264 and/or the headphones 270. The loudspeakers 262, 264 and/or the headphones 270 may be connected to a device (e.g., one of the one or more devices 250). In some embodiments, the loudspeakers 262, 264 and/or the headphones 270 may be conventional loudspeakers and/or headphones not designed specifically for rendering spatial audio. The loudspeakers may comprise two or more loudspeakers disposed according to various configurations. The headphones may comprise miniature speakers (also known as drivers and transducers). In some embodiments, the headphones may comprise two drivers, a first driver to be associated with a left ear and a second driver to be associated with a right ear. In some embodiments, the headphones may comprise more than two drivers, for example, two left drivers associated with a left ear and two right drivers associated with a right ear. In some embodiments, the headphones may fully or partially covering ears of a listener. In some embodiments, the headphones may be placed within a listener ear (e.g., earbuds or in-ear headphones). In some embodiments, the headphones may also comprise a microphone in addition to speakers (e.g., a headset). In some embodiments, the headphones may be part of a more complex system such as VR headsets and/or AR headsets. In some alternative embodiments, the loudspeakers and/or headphones may be specifically designed for spatial audio reproduction. In such embodiments, the loudspeakers and/or headphones may comprise one or more of 3D audio algorithms, head-tracking, anatomy calibration and/or multiple drivers at each ear. In some embodiments, the loudspeakers and/or the headphones may also comprise a computing environment similar to the computing environment of FIG. 1 which allows the loudspeakers and/or the headphones to execute one or more of the authoring tool 210, the renderer 230 and the real-time controller 240 without requiring any additional devices.

Figure 3:
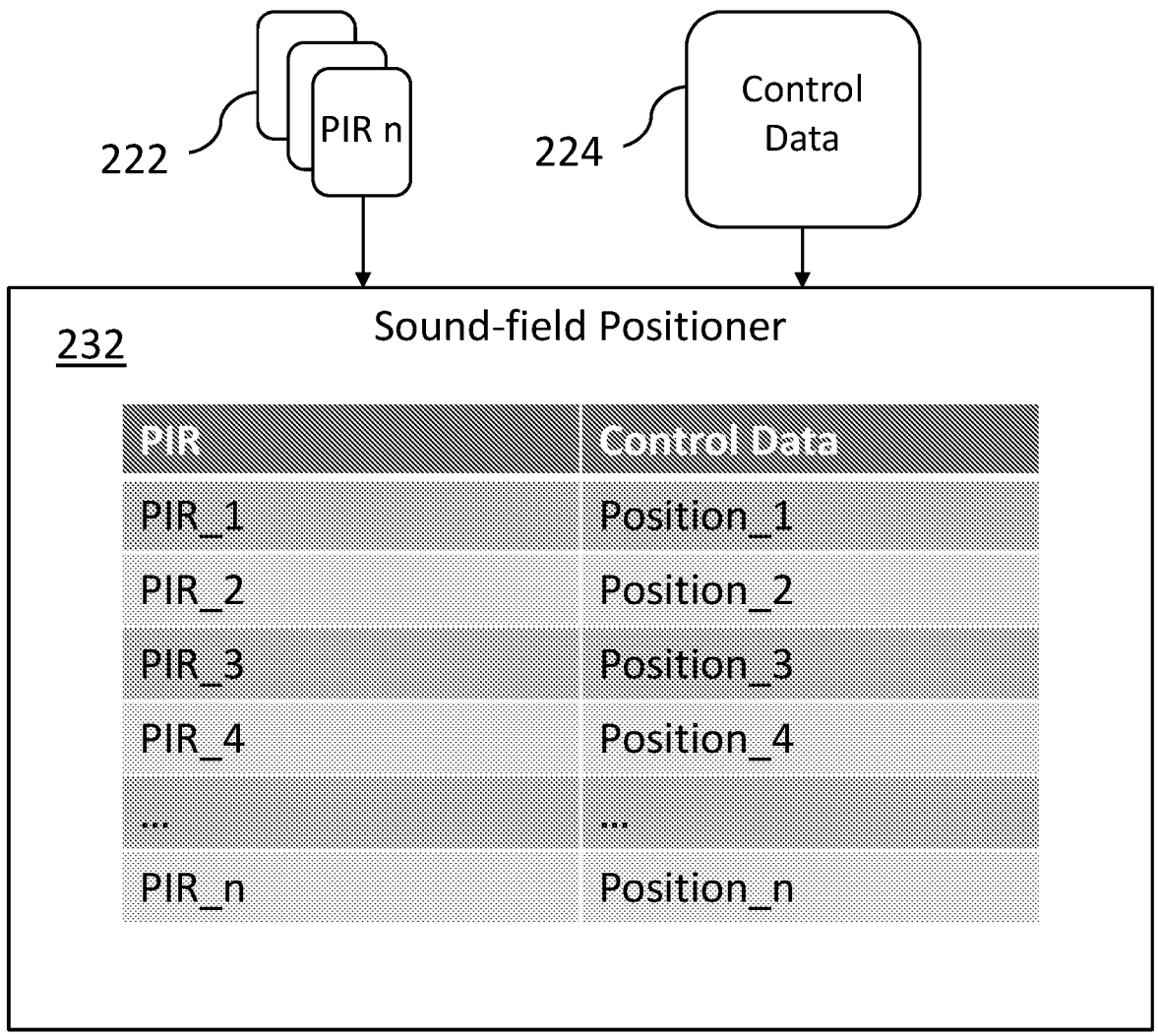
FIG. 3 is a diagram of a correspondence table associating positional impulse responses with positions in accordance with an embodiment of the present technology.
Figure 4:
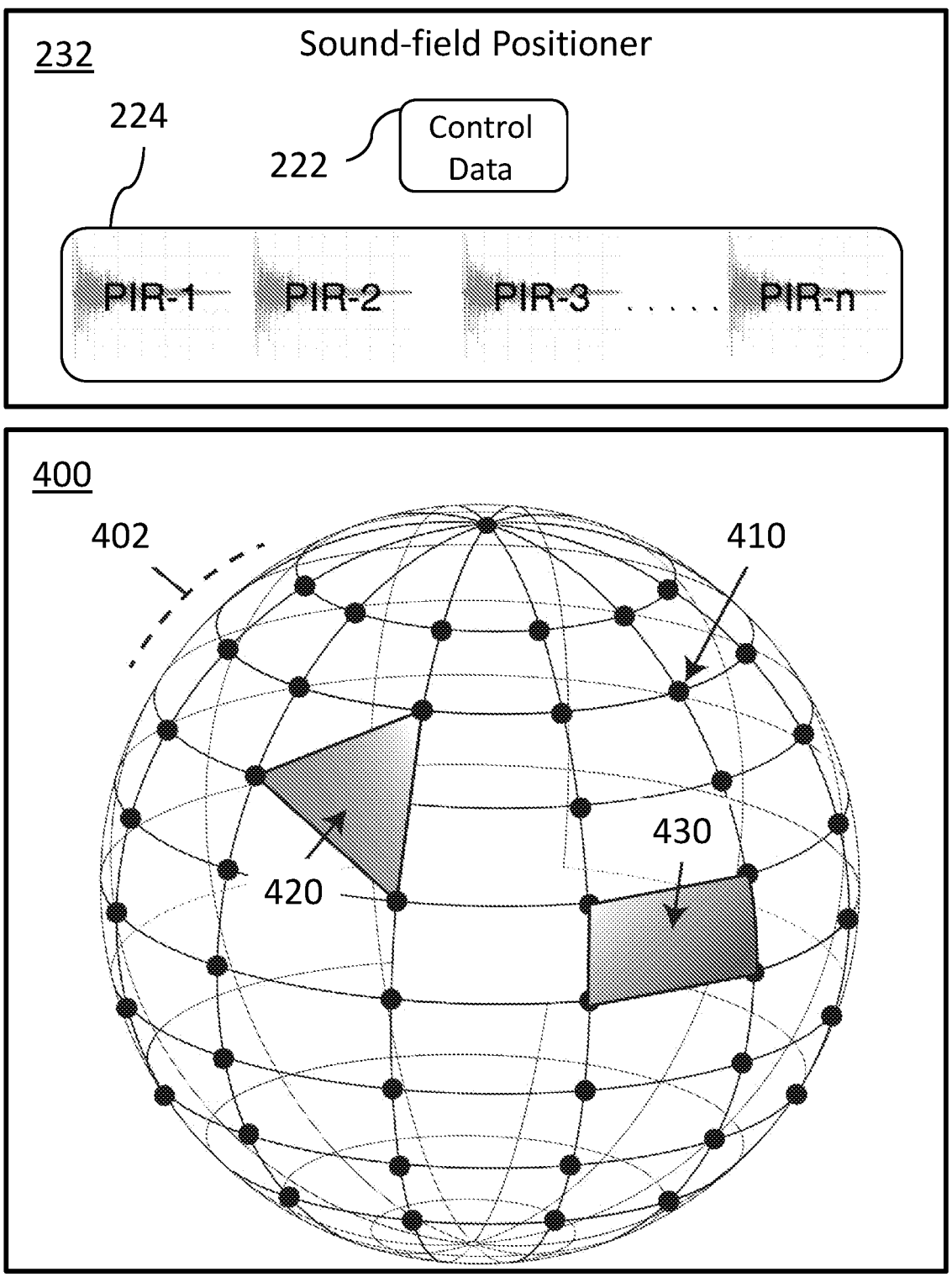
FIG. 4 is a representation of positional impulse responses and a three-dimensional space in accordance with an embodiment of the present technology.

Turning now to FIGS. 3 and 4, the sound-field positioner 232 is illustrated with a correspondence table associating positional impulse responses with positions. In some embodiments, the positional impulse responses are accessed from a set of positional impulse responses, such as the PIRs 222. In some embodiments, the positions are accessed from control data, such as the control data 224. As illustrated at FIG. 2, the PIRs 222 and the control data 224 may be accessed from an audio image file, such as the audio image file 220. In some embodiments, the sound-field positioner 232 may associate each one of the positions Position_1 to Position_n with each one of the positional impulse responses PIR_1 to PIR_n. In other embodiments, each one of the positions Position_1 to Position_n has been previously associated with a respective one of the positional impulse responses PIR_1 to PIR_n. Such associations of the positions and the positional impulse responses may be accessed by the sound-field positioner 232 from the control data 224.

As illustrated in FIG. 4, the positional impulse responses PIR_1 to PIR_n are represented as brief signals which may also be referred to as pulses or impulses. As the person skilled in the art of the present technology may appreciate, each one of the PIR_1 to PIR_n may be associated with a different pulse, each one of the different pulses being representative of acoustic characteristics at a given positon. In the illustrated embodiments, the control data 222 and the positional impulse responses 224 allow modeling acoustic characteristics of a three-dimensional space 400 represented as a sphere 400. The sphere 400 comprises a mesh defined by multiple positional impulse responses. Each one of the positional impulse responses being represented as a dot on the sphere 402. An example of such a dot, is a dot 410 represented by a positional impulse response 410 which location on the sphere is determined by a corresponding position. In some embodiments, the control data 222 allows positioning the positional impulse response 410 on the sphere. In some embodiments, the position may remain fixed while in other embodiments the position may be modified (either in real-time or not) via a controller (e.g., the real-time controller 240).

In some embodiments, multiple positional impulse responses may be combined together to define a polygonal positional impulse response. Such polygonal positional impulse response is illustrated by a first polygonal positional impulse response 420 and a second polygonal positional impulse response 430.

The first polygonal positional impulse response 420 comprises a first positional impulse response, a second positional impulse response and a third positional impulse response. Each one of the first positional impulse response, the second positional impulse response and the third positional impulse response is associated with a respective position. The combination of all three positions thereby defines the geometry of the first polygonal positional impulse response 420, in the present case, a triangle. In some embodiments, the geometry may be modified (either in real-time or not) via a controller (e.g., the real-time controller 240) and may define any shape (e.g., the three positions may define a line).

The second polygonal positional impulse response 430 comprises a fourth positional impulse response, a fifth positional impulse response, a sixth positional impulse response and a seventh positional impulse response. Each one of the fourth positional impulse response, the fifth positional impulse response, the sixth positional impulse response and the seventh positional impulse response is associated with a respective position. The combination of all four positions thereby defines the geometry of the second polygonal positional impulse response 430, in the present case, a quadrilateral. In some embodiments, the geometry may be modified (either in real-time or not) via a controller (e.g., the real-time controller 240).

In some embodiments, the first polygonal positional impulse response 420 and the second polygonal positional impulse response 430 may be relied upon to generate one or more audio images as it will be further depicted below in connection with the description of FIGS. 7 to 15.

Even though the example of FIG. 4 illustrates a combination of multiple positional impulse responses defining a sphere, it should be understood that the number of positional impulse responses, the respective position of each one of the positional impulse responses and the geometry of the three-dimensional space may vary and should therefore not be construed as being limitative. For example, but without being limitative, the geometry of the three-dimensional space may define a cube or any other geometry. In some embodiments, the geometry of the three-dimensional space may represent a virtual space (e.g., a sphere) and/or a real acoustic space.

Figure 5:
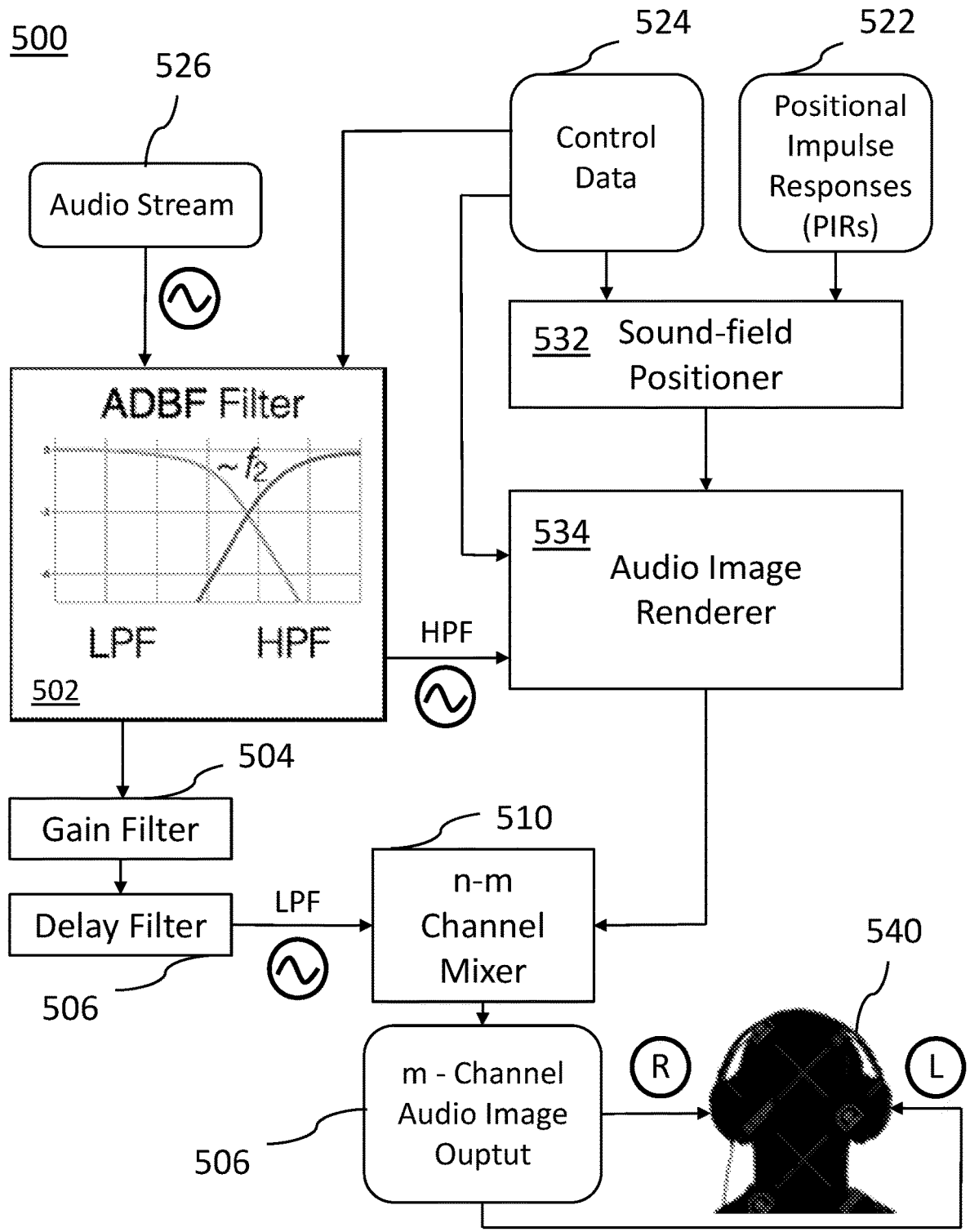
FIG. 5 is a diagram of an audio rendering system in accordance with an embodiment of the present technology.

Referring now to FIG. 5, an audio rendering system 500 is depicted. In some embodiments, the audio rendering system 500 may be implemented on a computing environment similar to the one described in FIG. 1. For example, but without being limitative, the audio rendering system 500 may be one of the one or more devices 250 illustrated at FIG. 2. The audio rendering system 500 comprises an acoustically determined band (ADBF) filter 502, a gain filter 504, a delay filter 506, a sound-field positioner 532, an audio image renderer 534 and a n-m channel mixer 510. In some embodiments, the sound-field positioner 532 is similar to the sound-field positioner 232 depicted in FIG. 2 and the audio image renderer 534 is similar to the audio image renderer 234. In some embodiments, the audio image renderer 534 may be referred to as a renderer and/or a decoder. In some embodiments, the audio image renderer 534 may comprise the ADBF filter 502, the sound-field positioner 532, the gain filter 504, the delay filter 506 and/or the n-m channel mixer 510. As the person skilled in the art of the present technology may appreciate, many combinations of the ADBF filter 502, the sound-field positioner 532, the gain filter 504, the delay filter 506 and/or the n-m channel mixer 510 may be envisioned as defining a renderer (or, for the sake of the present example, the audio image renderer 534).

In the example of FIG. 5, an audio stream 526, positional impulse responses (PIRs) 522 and control data 524 are accessed for example, but without being limitative, by a renderer from an audio image file. The audio image file may be similar to the audio image file 220 of FIG. 2. In some embodiments, the control data 524 and the PIRs 522 are accessed by the sound-field positioner 532. The control data 524 may also be accessed and/or relied upon by the audio image renderer 534. In some embodiments, such as the one illustrated at FIG. 6, the control data 524 may also be accessed and/or relied upon by the n-m channel mixer 510.

In the illustrated embodiments, the audio stream 526 is filtered by the ADBF filter 502 before being processed by the audio image renderer 524. It should be understood that even though a single audio stream is illustrated, the processing of multiple audio streams is also envisioned, as previously discussed in connection with the description of FIG. 2. The ADBF filter 502 is configured to divide the audio stream 526 by generating a first audio sub-stream by applying a high-pass filter (HPF) and a second audio sub-stream by applying a low-pass filter (LPF). The first audio sub-stream is transmitted to the audio image renderer 534 for further processing. The second audio sub-stream is transmitted to the gain filter 504 and to the delay filter 506 so that a gain and/or a delay may be applied to the second audio sub-stream. The second audio sub-stream is then transmitted to the n-m channel mixer 510 where it is mixed with a signal outputted by the audio image renderer 524. In some alternative embodiments, the audio stream 526 may be directly accessed by the audio image renderer 534 without having been previously filtered by the ADBF filter 502.

As it may be appreciated by a person skilled in the art of the present technology, the n-m channel mixer 510 may take 2 or more channels as an input and output 2 or more channels. In the illustrated example, the n-m channel mixer 510 takes the second audio sub-stream transmitted by the delay filter 506 and the signal outputted by the audio image renderer 524 and mixes them to generate an audio image output. In some embodiments wherein 2 channels are to be outputted, the n-m channel mixer 510 takes (1) the second audio sub-stream associated with a left channel transmitted by the delay filter 506 and the signal associated with a left channel outputted by the audio image renderer 524 and (2) the second audio sub-stream associated with a right channel transmitted by the delay filter 506 and the signal associated with a right channel outputted by the audio image renderer 524 to generate a left channel and a right channel to be rendered to a listener. In some alternative embodiments, the n-m channel mixer 510 may output more than 2 channels, for example, for cases where the audio image is being rendered on more than two speakers. Such cases include, without being limitative, cases where the audio image is being rendered on headphones having two or more drivers associated with each ear and/or cases where the audio image is being rendered on more than two loudspeakers (e.g., 5.1, 7.1, Dolby AC-4® from Dolby Laboratories, Inc. settings).

Figure 6:
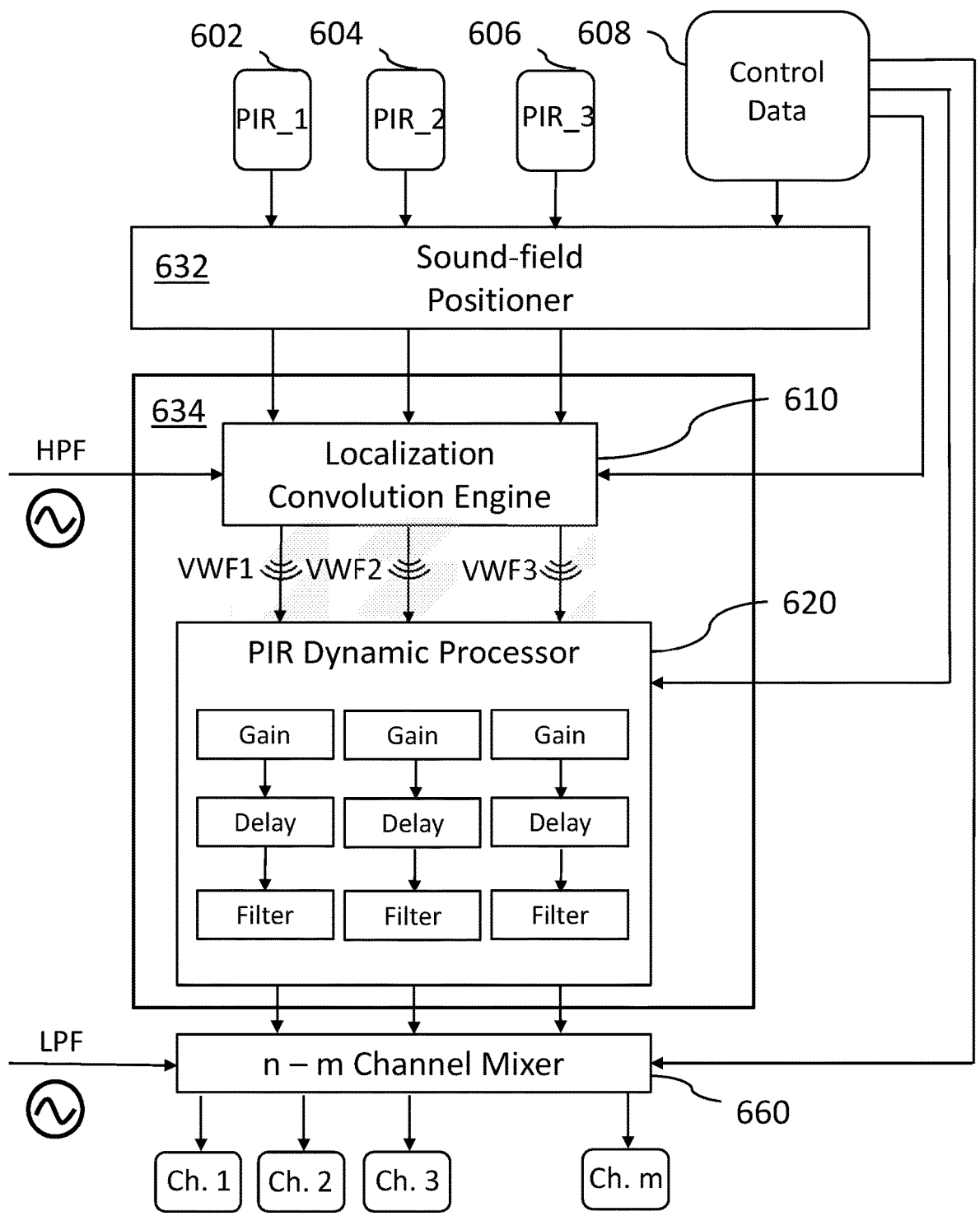
FIG. 6 is a diagram of various components of an audio rendering system in accordance with an embodiment of the present technology.

Turning now to FIG. 6, a sound-field positioner 632, an audio image renderer 634 and a n-m channel mixer 660 are illustrated. In some embodiments, the sound-field positioner 632 may be similar to the sound-field positioner 532, the audio image renderer 634 may be similar to the audio image renderer 534 and the n-m channel mixer 660 may be similar to the n-m channel mixer 510. In the illustrated embodiments, the audio image renderer 634 comprises a localisation convolution engine 610 and a positional impulse response (PIR) dynamic processor 620. In the illustrated embodiment, the sound-field positioner 632 accesses a first positional impulse response (PIR_1) 602, a second positional impulse response (PIR_2) 604 and a third positional impulse response (PIR_3) 606. The sound-field positioner 632 also accesses control data 608. In the illustrated embodiment, the control data 608 are also accessed by the audio image renderer 634 so that the control data may be relied upon by the localization convolution engine 610 and the PIR dynamic processor 620. The control data 608 are also accessed by the n-m channel mixer 660. As it may be appreciated, in such embodiments, the control data 608 may comprise instructions and/or data relating to configuration of the sound-field positioner 632 (e.g., positions associated or to be associated with the PIR_1 602, the PIR_2 604 and/or the PIR_3 606), the localization convolution engine 610, the PIR dynamic processor 620 and/or the n-m channel mixer 660.

In the embodiment illustrated at FIG. 6, the localization convolution engine 610 is being inputted with an audio stream, the control data 608, the PIR_1 602, the PIR_2 604 and the PIR_3 606. In the illustrated embodiment, the audio stream inputted to the localization convolution engine 610 is a filtered audio stream, in this example an audio stream filtered with a high-pass filter. In some alternative embodiments, the audio stream inputted to the localization convolution engine 610 is a non-filtered audio stream. The localization convolution engine 610 allows generating a first virtual wave front (VWF1) based on the audio stream and the PIR_1 602, a second virtual wave front (VWF2) based on the audio stream and the PIR_2 604 and a third virtual wave front (VWF3) based on the audio stream and the PIR_3 606. In the illustrated embodiment, generating the VWF1 comprises convolving the audio stream with the PIR_1 602, generating the VWF2 comprises convolving the audio stream with the PIR_2 604 and generating the VWF3 comprises convolving the audio stream with the PIR_3 606. In some embodiments, the convolution is based on a Fourier-transform algorithm such as, but not limited to, the fast Fourier-transform (FFT) algorithm. Other examples of algorithms to conduct a convolution may also be envisioned without departing from the scope of the present technology. In some embodiments, generating the VWF1, the VWF2 and the VWF3 is executed by the localization convolution engine 610 in parallel and synchronously so as to define an audio image for being rendered to a listener. In the illustrated embodiment, the VWF1, the VWF2 and the VWF3 are further processed in parallel by the PIR dynamic processor 620 by applying to each one of the VWF1, the VWF2 and the VWF3 a gain filter, a delay filter and additional filtering (e.g., a filtering conducted by an equalizer). The filtered VWF1, VWF2 and VWF3 are then inputted to the n-m channel mixer 660 to be mixed to generate multiple channels, namely Ch. 1, Ch. 2, Ch. 3 and Ch. m. In the illustrated embodiments, the filtered VWF1, VWF2 and VWF3 are being mixed with the audio stream on which a low-pass filter has been applied. As previously detailed above, in some embodiments, the audio stream may not need to be filtered prior before being inputted to the audio image renderer 634. As a result, in such embodiments, the the VWF1, the VWF2 and the VWF3 may be mixed together by n-m channel mixer 660 without requiring inputting the audio stream on which a low-pass filter has been applied to the n-m channel mixer 660. In addition, in some embodiments, the n-m channel mixer 660 may solely output two channels, for examples for cases where the audio image is to be rendered on headphones. Many variations may therefore be envisioned without departing from the scope of the present technology.

Figure 7:
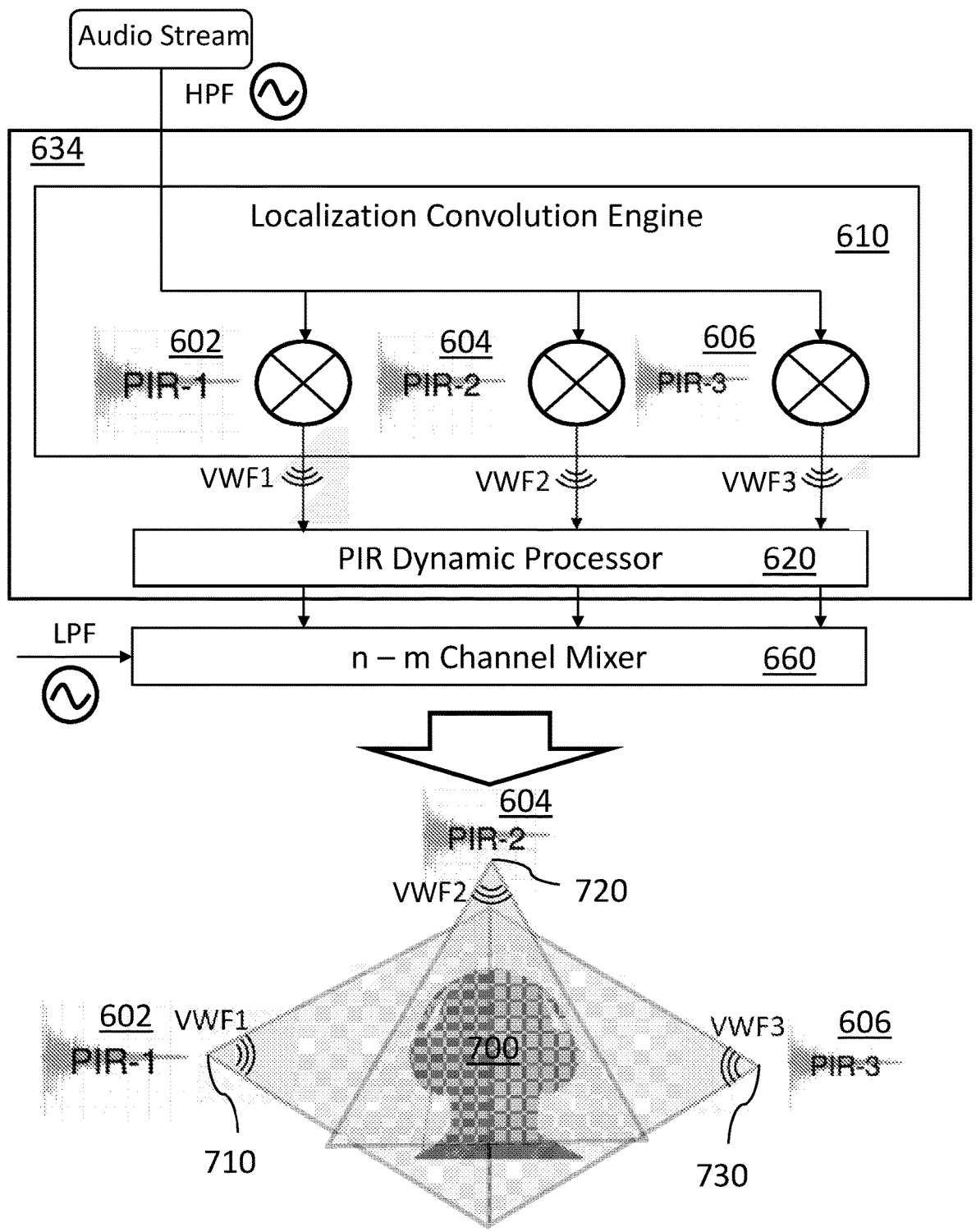
FIG. 7 is a diagram of various components of an audio rendering system rendering an audio image in accordance with an embodiment of the present technology.

FIG. 7 depicts an audio image 700 being rendered by the audio image renderer 634 and the n-m channel mixer 660 of FIG. 6. As previously detailed above in connection with the description of FIG. 6, the localization convolution engine 610 of the audio image renderer 634 executes in parallel a convolution of the audio stream with the PIR_1 602 to generate the VWF1, a convolution of the audio stream with the PIR_2 604 to generate the VWF2 and a convolution of the audio stream with the PIR_3 606. As can be seen in FIG. 7, the VWF1 is perceived by the listener as emanating from a first position 710, the VWF2 is perceived by the listener as emanating from a second position 720 and the VWF3 is perceived by the listener as emanating from a third position 730. In some embodiments, the first position 710 is associated with the PIR_1 602. The second position 720 is associated with the PIR_2 604. The third position 730 is associated with the PIR_3 606. The first position 710, the second position 720 and/or the third position 730 may be determined and/or controlled by a sound-field positioner (e.g., the sound-field positioner 632) and may be based, but not necessarily, on control data (e.g., the control data 608).

As it may be appreciated in FIG. 7, the audio image 700 is defined by the combination of the VWF1, the VWF2 and the VWF3. The audio image 700, upon being rendered to the listener, may therefore be perceived by the listener as an immersive audio volume, similar to what the listener would experience in real life. In some embodiments, the immersive audio volume may be referred to as a virtual immersive audio volume as the audio image allows to "virtually" recreates a real-life experience. In some embodiments, the audio image may be referred to as a 3D experiential audio image.

Figure 8A:
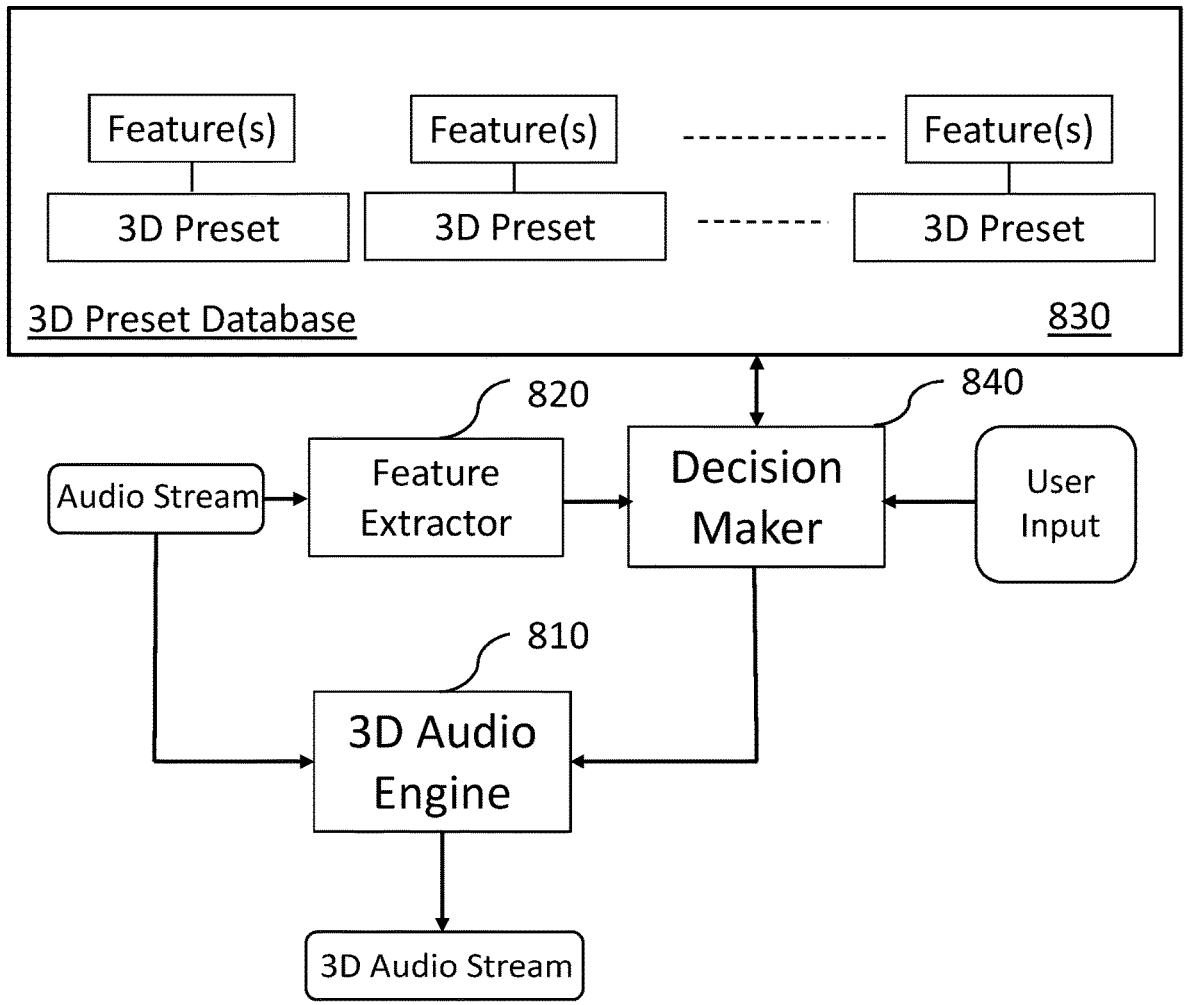
FIGS. 8A and 8B are diagrams of various components of an audio rendering system comprising a 3D audio engine controlled by a decision maker in accordance with embodiments of the present technology is illustrated.
Figure 8B:
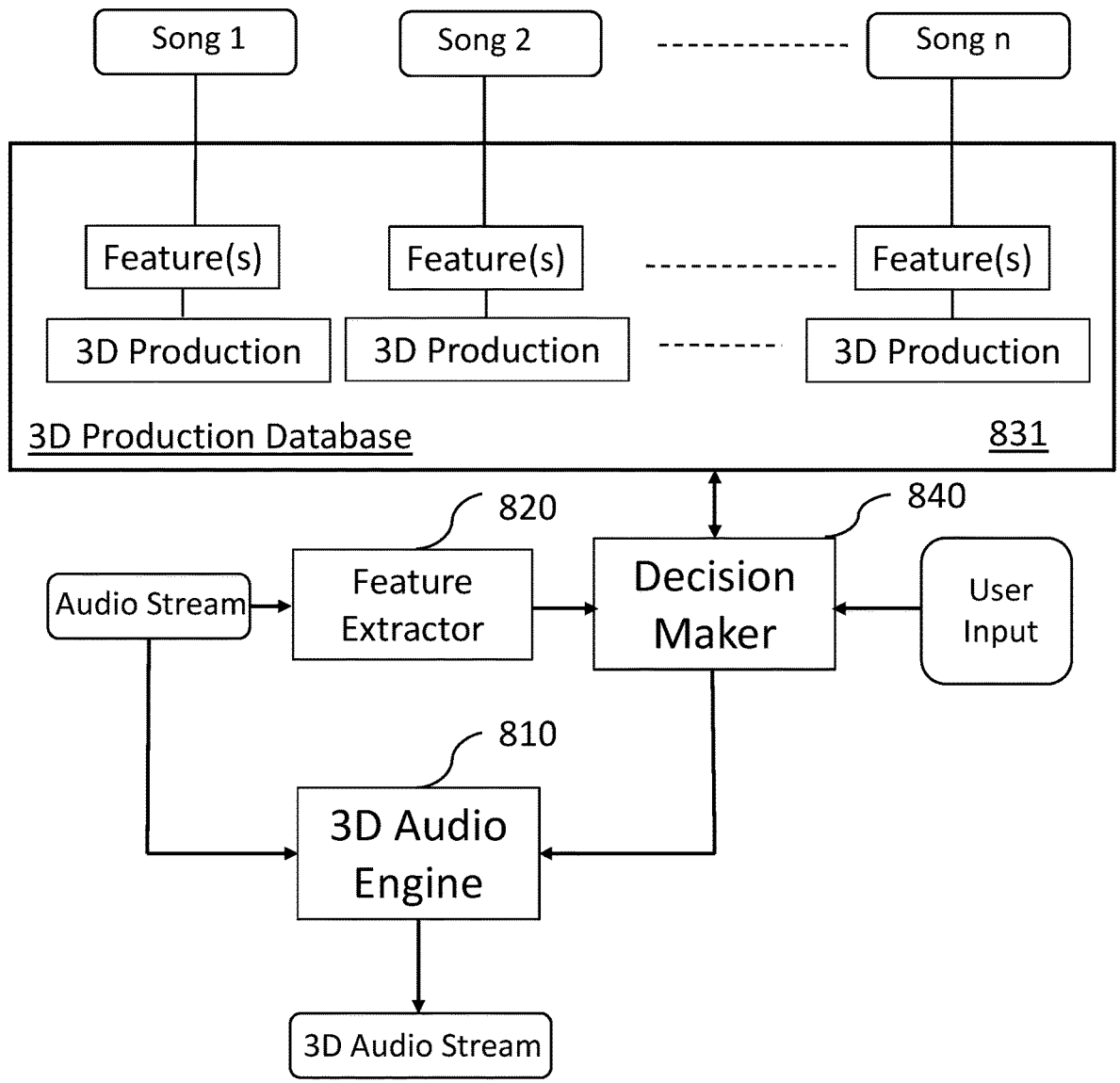

Turning to FIGS. 8A and 8B, a 3D audio engine 810 controlled by a decision maker 840 in accordance with embodiments of the present technology is illustrated. The decision maker 840 is connected to a feature extractor 820 and may query a 3D preset database 830. Although represented as comprising 3D presets and features, it should be understood that the 3D preset database 830 may only contain 3D presets to be used independently of any relationships with features. FIG. 8B illustrates an embodiment wherein the decision maker 840 may also query a 3D production database 831 containing a plurality of 3D productions. In some embodiments, the decision maker 840 may query both the 3D preset database 830 and the 3D production database 831. In some embodiments, the decision maker 840 may only query the 3D production database 831.

In some embodiments, the 3D presets of the 3D preset database 830 are each generic 3D control parameters which may have been configured so as to be applicable to a plurality of distinct audio streams (e.g., a plurality of songs) while the 3D productions of the 3D production database 831 are 3D control parameters specifically customized for a unique audio stream (e.g., for a given song).

In some embodiments, the decision maker 820 and/or the 3D preset database 830 and/or the 3D production database 831 may be part of the 3D audio engine 810. In some alternative embodiments, the decision maker 820 and/or the 3D preset database 830 and/or the 3D production database 831 may operate on distinct computing devices (e.g., the decision maker 820 and/or the 3D preset database 830 may be hosted on a server remote from a device operating the 3D audio engine 810).

In some embodiments, the 3D audio engine 810 operates logic allowing creation of an audio image, equally referred to a 3D audio image or a 3D audio stream. In some embodiments, the 3D audio engine 810 may receive as an input an audio stream (e.g., a stereo audio file) which is processed so as to output a 3D audio stream. In some embodiments, the 3D audio engine 810 may comprise and/or may be enabled by one or more of an authoring tool, a sound-field positioner and/or an audio image renderer such as, for example, but without being limitative, the authoring tool 210, a sound-field positioner 232, 532, 632 and/or the audio image renderer 234, 534, 634 previously described in connection with FIG. 1-7. Multiple variations as to how the 3D audio engine 810 is implemented may be envisioned without departing from the scope of the present technology.

In some embodiments, the 3D audio engine 810 relies on 3D presets and/or 3D productions to generate a 3D audio stream. Although, reference is made to "generating a 3D audio stream", it is understood that this term is not limitative and should encompass terms that will become apparent to the person skilled in the art of the present technology (e.g., "transform into a 3D audio stream", "create a 3D audio stream"). In some embodiments, each 3D preset and/or 3D production may comprise one or more 3D control parameters. The one or more 3D control parameters may comprise a list of positional impulse responses (PIRs), a list of identifiers allowing to retrieve PIRs and/or a number of PIRs. In some embodiments, the 3D control parameters may also include a list of positions of PIRs, a list of identifiers allowing to retrieve positions of PIRs. In some embodiments, a position associated with a PIR may be defined as a position in a virtual space from which a virtual wave front associated with a given PIR emanates. In some embodiments, a position associated with a PIR may be defined by one or more of an azimuth, an elevation and/or a distance.

In some embodiments, the 3D control parameters may also comprise one or more settings of audio processing to be applied by a PIR dynamic processor (e.g., the PIR dynamic processor 620) and/or an n-m channel mixer (e.g., the n-m channel mixer 660). As an example, settings of audio processing to be applied by the PIR dynamic processor may comprise settings of one or more of a gain, a delay and/or a filter to be applied to a given virtual wave front associated with a given PIR generated by the audio engine 810.

In accordance with embodiment of the present technology, the 3D audio engine 810 may rely on 3D presets and/or 3D productions to create an audio configuration to be used for the generation of the 3D audio stream by the 3D audio engine 810. As an example, but without being limitative, the 3D audio engine 810 may generate three virtual wave fronts VWF1, VWF2 and VWF3 by selecting and positioning three PIRs identified and positioned based on the 3D preset and/or the 3D production. In addition, the 3D audio engine 810 may also rely on the 3D preset and/or the 3D production to apply further audio processing to the three virtual wave fronts VWF1, VWF2 and VWF3, for example by configuring the PIR dynamic processor and/or the n-m channel mixer based on the 3D preset and/or the 3D production. Variations as to how the 3D preset and/or the 3D production may be relied upon by the 3D audio engine 810 may be envisioned without departing from the scope of the present technology.

In accordance with embodiments of the present technology, a 3D audio stream generated by the 3D audio engine 810 from an audio stream (e.g., a stereo audio stream) may be perceived differently by a listener based on which 3D preset and/or 3D production have been relied upon. One of the challenges that the present technology attempt to alleviate is determination a 3D preset and/or a 3D production which is likely to result in a more immersive and/or compelling experience for the listener for a given 3D audio stream or a given sub-portion of the 3D audio stream (e.g., a song, a segment of a song). In embodiments of the present technology, determination of which 3D preset and/or 3D production from a collection of pre-existing 3D presets and/or 3D productions is to be used by the 3D audio engine 810 may be made by the decision maker 840. Even though reference is made to "a" 3D preset or "a" 3D production applied to "an" audio stream, it should be understood that, in certain embodiments, the determination may be made dynamically by the decision maker 840 so that the decision maker 840 may adapt dynamically to a content of the audio stream (e.g., select a plurality of 3D presets and/or 3D productions to be applied to the audio stream over a given period of time).

In some embodiments, the decision maker 840 may also further adapt one or more selected 3D presets and/or 3D productions and create a new set of 3D control parameters customized for a given audio stream (or portion of a given audio stream) thereby providing dynamic 3D control parameters creation from databases of existing 3D presets and/or 3D productions. In some embodiments, the customized 3D control parameters may be uniquely created for the given audio stream (or portion of the given audio stream).

In embodiments of the present technology, the decision maker 840 may receive input data from the feature extractor 820, the input data may be referred to as one or more values of one or more extracted features. In some embodiments, the one or more extracted features may also be referred to as one or more feature vectors which may take different values for different inputs. The one or more values of the one or more extracted features may have been generated by the feature extractor based on the audio stream. In some embodiments, the feature extractor 820 may be based on a Deep Neural Network (DNN) in which an input may be the audio signal in either time or frequency domain and its output may be a feature vector which may then be relied upon by the decision maker 840.

Also reference is made to "an" extracted feature, it should be understood that the extracted feature may comprise a plurality of extracted features extracted from the audio stream (e.g., loudness, correlation histogram, etc). When the audio stream is an audio song, the one or more values of the extracted feature may be generated for the audio song. In other embodiments, the one or more values of the extracted feature may be generated dynamically, for example at every given period of time (e.g., 10 seconds) or based on variations of the audio stream observed by the feature extractor 820. Multiple variations as to how the feature extractor is implemented may be envisioned without departing from the scope of the present technology.

In embodiments of the present technology, the decision maker 840 may receive a user input from a user (e.g., a user of a device on which the 3D audio engine 810 is operated). In some embodiments, a set of one or more 3D presets may be presented to the user. The user may select and/or edit a 3D preset from the set of one or more 3D presets. The selection and/or edit of the 3D preset may be done in-real time so that the user may directly experience how the 3D preset impacts a rendering of the 3D audio stream by the 3D audio engine 810. The selection and/or edit of the 3D preset by the user may also be based on listening experiences the user has previously experienced. Other variations may also be envisioned without departing from the scope of the present technology.

In embodiments of the present technology, the decision maker 840 may also access the 3D preset database 830 and/or the 3D production database 831. The 3D preset database 830 and/or the 3D production database 831 may store a plurality of 3D presets and/or 3D productions each associated with different values of features. In the illustrated embodiments, a first value of a feature may be associated with a first 3D production, the first value of the feature may be associated with a first sample audio stream (e.g., a first song "song 1"), a second value of a feature may be associated with a second 3D production, the second value of the feature may be associated with a second sample audio stream (e.g., a second song "song 2") and a third value of a feature may be associated with a third 3D production, the third value of the feature may be associated with a third sample audio stream (e.g., a third song "song n").

In some embodiments, the 3D preset database 830 and/or the 3D production database 831 are populated manually and/or automatically and allow associating values of one or more features with 3D presets and/or 3D productions. As an example, determination may have been made that the first 3D production is an optimal (or close to optimal) 3D production for song 1. The first value of the feature may then be generated based on song 1 and may be associated with the first 3D production. The first value of the feature and the first 3D production may be associated in the 3D production database 831 for later retrieval by the decision maker 840.

In alternative embodiments, the 3D production database 831 associates a 3D production with a given audio content, for example, the first 3D production is associated with the song 1, the second 3D production is associated with the song 2 and the third 3D production is associated with the song n. Value(s) of feature(s) (or values of feature vectors) associated with each one of the song 1, song 2 and song 3 may later be processed without necessarily having to be stored and/or associated with a given 3D production directly in the 3D production database 831. The values of feature(s) associated with each one of the song 1, song 2 and song n may be computed for example upon request of the decision maker 840. Variations may therefore be envisioned without departing from the scope of the present technology.

According to an embodiment of the present technology, the decision maker 840 may compare one or more values of one or more extracted features extracted from the audio stream by the feature extractor 820 with one or more entries of the 3D preset database 830 and/or the 3D production database 831. The comparison may involve identifying a closest value of the feature from the 3D preset database 830 and/or the 3D production database 831 based on a comparison metric between the one or more values of the one or more extracted features and one or more values of the feature and/or one or more audio contents (e.g., song 1, song 2 and song n) of the 3D preset database 830 and/or the 3D production database 831. Various approaches as to how such identification is implemented may be envisioned without departing from the scope of the present technology, such as, but without being limitative, a nearest neighbour or multiple nearest neighbours.

Once one or more values of the one or more features and/or an audio content from the 3D preset database 830 and/or the 3D production database 831 is identified as value(s) of the feature (s) corresponding (or corresponding closely enough) to the extracted value(s) of the feature(s), the 3D control parameters of the 3D preset and/or the 3D production associated with the value(s) of the feature(s) and/or the audio content in the 3D preset database 830 and/or the 3D production database 831 may be retrieved (and applied to the 3D audio engine 810) by the decision maker 840. As an example, if the second value of the feature is identified by the decision maker 840 as the feature corresponding to the extracted feature, then the second 3D production is retrieved (and applied to the 3D audio engine 810).

In some embodiments, the decision maker 840 may also take into consideration the user input to influence which one of the 3D presets from the 3D preset database 830 and/or the 3D production from the 3D production database 831 is to be retrieved.

In accordance with embodiments of the present technology, one of the features relies upon by the decision maker 840 is a metric associated with a frequency distribution of correlations of an audio stream. According to an approach, a transformation from standard-stereo audio to 3D audio may be measured and quantified in terms of de-correlation. In some embodiments of the present technology, the correlation may be measured in accordance with the following equations:

$$\phi = \tan^{-1}\left(\frac{x_l}{x_r}\right)$$

$$\|x\| = \sqrt{x_l^2 + x_r^2}$$

$$\text{corr}(x_l, x_r) = \phi\|x\|$$

In some embodiments, xl and xr are the left and right channel's sample values at a given time. Phi is the phase between left and right channels if we were to picture the left and right channel in a two dimensional plane. Then $\|x\|$ is the vector length. The correlation (corr) is then the product of the phase and the vector length.

In embodiments of the present technology, a frequency distribution of correlations is generated for a plurality of audio productions (e.g., song 1, song 2, song n, etc) each of which being associated with a 3D preset and/or a 3D production. The frequency distribution of correlations may be used as a feature to be associated with the 3D production of the audio production from which the frequency distribution of correlations has been calculated.

Figure 9:
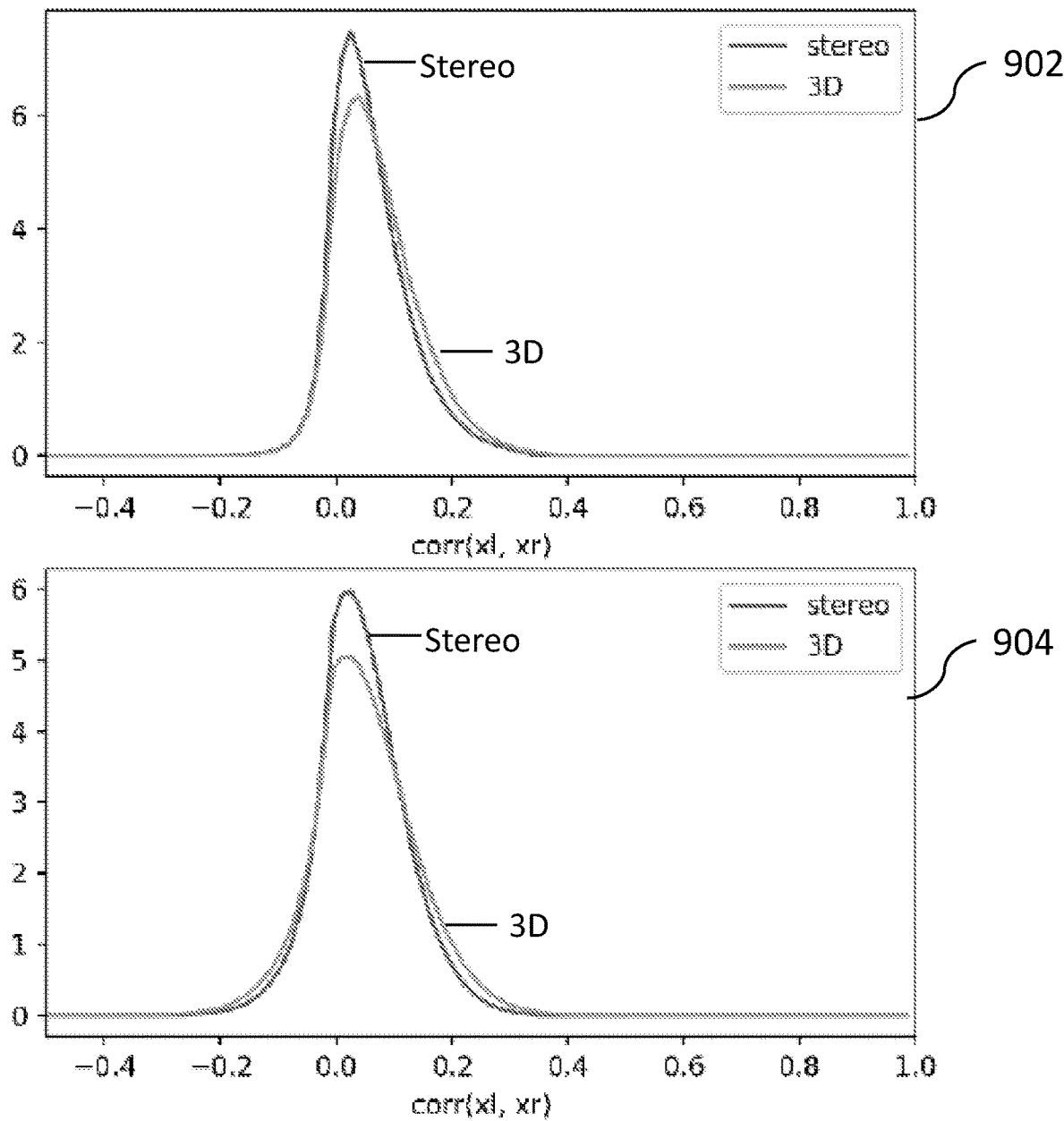
FIGS. 9-11 are graphics illustrating various examples of frequency distribution of correlations of audio productions in accordance with embodiments of the present technology.
Figure 10:
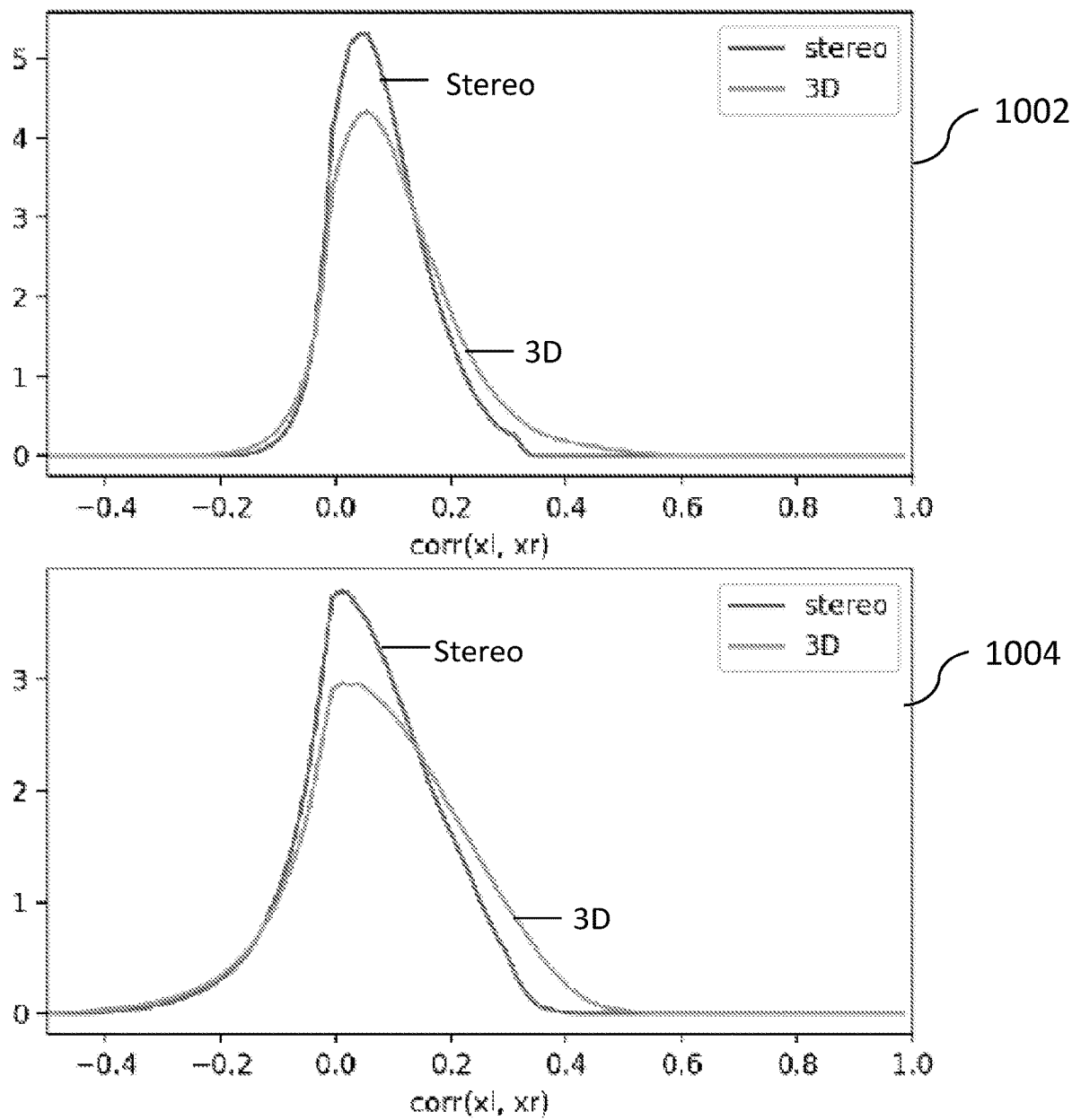

Multiple examples of frequency distribution of correlations 902, 904, 1002 and 1004 are illustrated at FIGS. 9 and 10. The frequency distribution of correlations 902, 904, 1002 and 1004 illustrate that a spatialization process allowing generation of a 3D audio stream from an audio stream may be quantified in terms of de-correlation. A frequency distribution of correlations be wider after processing (3D) compared to an input (stereo).

Figure 11:
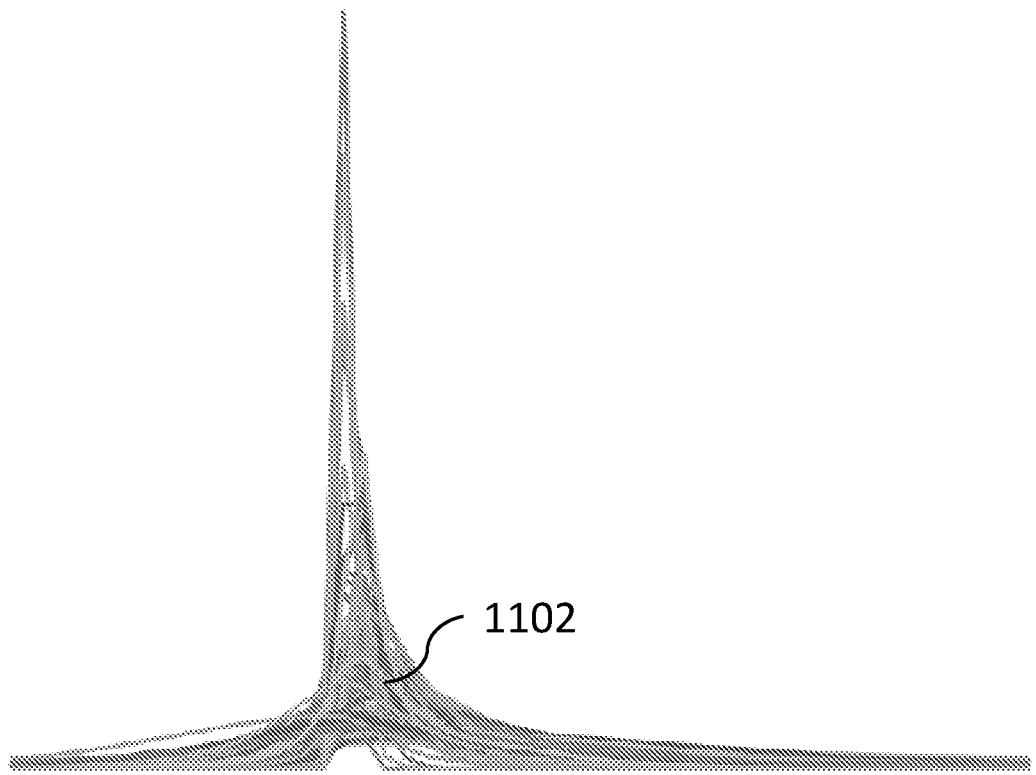

In embodiments of the present technology, the decision maker 840 may implement logic to compare an extracted frequency distribution of correlations (in such instance, the extracted feature is the extracted frequency distribution of correlations) extracted from the audio stream with a plurality of frequency distribution of correlations stored in the 3D preset database 830 and/or in the 3D production database 831. An example of a plurality of frequency distribution of correlations 1102 is illustrated at FIG. 11. In some embodiments, the logic causes a calculation of a Kullback Leibler Divergence (KLD) between an input signal's correlation frequency distribution and all or some reference frequency distributions of correlations. In certain embodiments, the decision maker 840 may select the 3D production associated with an audio production (e.g., song 1, song 2 or song n) which minimizes the KLD. In some embodiments, the Kullback Leibler Divergence (KLD) is calculated in accordance with the following equation:

$$D_{KL}(p\|q) = \sum_{k=0}^{n-1} p(k)\log\frac{p(k)}{q(k)}$$

In some embodiments, the decision maker 840 implements a machine learning algorithm comparing frequency distributions of correlations to select the 3D preset or the 3D production. In embodiments, a machine learning algorithm may also be operated to populate and maintain the 3D preset database 830 and/or the 3D production database 831 so as to optimize a number of and a relevancy of 3D presets and 3D productions to be chosen from by the decision maker 840.

Figure 12:
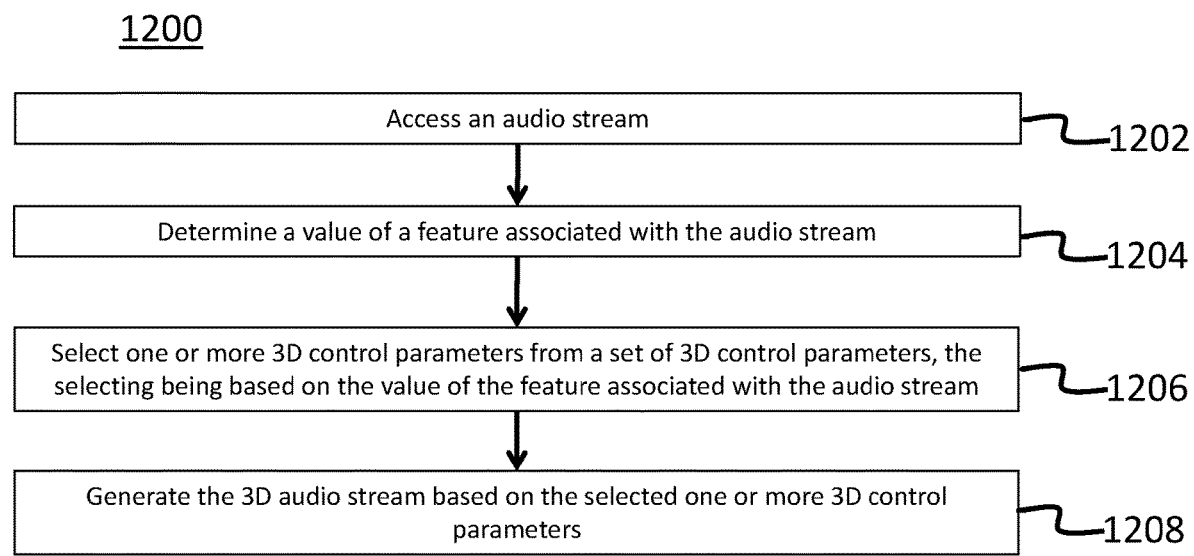
FIG. 12 is a diagram illustrating a flowchart illustrating a first computer-implemented method implementing embodiments of the present technology.

Turning now to FIG. 12, a flowchart illustrating a computer-implemented method 1200 of controlling generation of a 3D audio stream is illustrated. Even though reference is generally made to a method of of controlling generation of a 3D audio stream, it should be understood that in the present context, the method 1200 may also be referred to as a method of rendering an audio image to a listener. In some embodiments, the computer-implemented method 1200 may be (completely or partially) implemented on a computing environment similar to the computing environment 100, such as, but not limited to the one or more devices 250.

The method 1200 starts at step 1202 by accessing an audio stream. In some embodiments, the audio stream is a first audio stream and the method 1200 further comprises accessing a second audio stream. In some embodiments, the audio stream is an audio channel. In some embodiments, the audio stream is one of a mono audio stream, a stereo audio stream and a multi-channel audio stream.

Then, at a step 1204, the method 1204 determines a value of a feature associated with the audio stream. In some embodiments, the feature comprises a frequency distribution of correlations associated with the audio stream.

Then, at a step 1206, the method 1200 selects one or more 3D control parameters from a set of 3D control parameters, the selecting being based on the value of the feature associated with the audio stream.

In some embodiments, the feature is a metric associated with a frequency distribution of correlations of the audio stream. In some embodiments, the selecting the 3D control parameters comprises accessing a database of 3D productions, the database comprising associations between values of frequency distributions of correlations and 3D productions, each 3D production being associated with 3D control parameters specifically customized for a unique audio stream.

In some embodiments, the selecting the 3D control parameters comprises accessing a database of 3D presets, the database comprising associations between values of frequency distributions of correlations and 3D presets, the 3D presets being generic 3D control parameters.

In some embodiments, the one or more 3D control parameters comprises at least one of a list of positional impulse responses (PIRs), a list of identifiers allowing to retrieve PIRs, a number of PIRs, a list of positions of PIRs and/or a list of identifiers allowing to retrieve positions of PIRs. In some embodiments, the positions of PIRs are defined by one or more of an azimuth, an elevation and/or a distance. In some embodiments, the 3D control parameters comprise one or more of a gain, a delay and/or a filter to be applied to a given virtual wave front associated with a given PIR generated by an audio engine. In some embodiments, generating the 3D audio stream comprises generating three virtual wave fronts by selecting and/or positioning three PIRs identified and/or positioned based on the one or more 3D control parameters. In some embodiments, the determining the frequency distribution of correlations is done in real-time and the selecting of one or more 3D control parameters is done dynamically so as to adapt to the content of the audio stream.

In some embodiments, selecting one or more 3D control parameters from a set of 3D control parameters comprises creating new 3D control parameters customized for the audio stream. In some embodiments, the creating the new 3D control parameters customized for the audio stream comprises selecting and adapting pre-existing 3D control parameters.

In some embodiments, the selecting the one or more 3D control parameters from a set of 3D control parameters comprises calculating a Kullback Leibler Divergence (KLD) comparing the correlation frequency distribution of correlations of the audio stream and reference frequency distributions of correlations associated with the 3D parameters. In some embodiments, the selecting is done so as to minimize the KLD. In some embodiments, the selecting is further based on a user input. In some embodiments, the feature is extracted based on a Deep Neural Network (DNN) which takes for input the audio stream in either time or frequency domain and which outputs a feature vector on which selection of the one or more 3D control parameters is based.

Then, at a step 1208, the method 1200 generates the 3D audio stream based on the selected one or more 3D control parameters.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user and/or the listener enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of controlling generation of a 3D audio stream, the method comprising:
   accessing an audio stream;
   generating a feature vector associated with the audio stream by a Deep Neural Network (DNN) which takes for input the audio stream in either time or frequency domain and which outputs the feature vector;
   selecting one or more 3D control parameters from a set of 3D control parameters, the selecting being based on the feature vector associated with the audio stream; and
   generating the 3D audio stream based on the selected one or more 3D control parameters.

2. The method of claim 1, wherein the feature vector comprises a metric associated with a frequency distribution of correlations of left and right channels of the audio stream.

3. The method of claim 2, wherein the selecting the one or more 3D control parameters comprises accessing a database of 3D productions, the database comprising associations between values of frequency distributions of correlations and 3D productions, each 3D production being associated with 3D control parameters specifically customized for a unique audio stream.

4. The method of claim 2, wherein the selecting the one or more 3D control parameters comprises accessing a database of 3D presets, the database comprising associations between values of frequency distributions of correlations and 3D presets, the 3D presets being generic 3D control parameters.

5. The method of claim 2, further comprising determining the frequency distribution of correlations in real-time, and wherein the selecting of the one or more 3D control parameters is done dynamically.

6. The method of claim 2, wherein the frequency distribution of correlations is calculated based on the following equations:

$$\phi = \tan^{-1}\left(\frac{x_l}{x_r}\right)$$

$$\|x\| = \sqrt{x_l^2 + x_r^2}$$

$$\mathrm{corr}(x_l, x_r) = \phi\|x\|$$

wherein xl and xr are left and right channels sample values at a given time of the audio stream, Phi is the phase between the left and right channels, $\|x\|$ is a vector length of the feature vector and the correlation (corr) is a product of the phase and the vector length.

7. The method of claim 6, wherein the selecting the one or more 3D control parameters comprises minimizing the KLD.

8. The method of claim 2, wherein the selecting the one or more 3D control parameters from the set of 3D control parameters comprises calculating a Kullback Leibler Divergence (KLD) comparing the frequency distribution of correlations of left and right channels of the audio stream and reference frequency distributions of correlations associated with the 3D parameters.

9. The method of claim 1, wherein the one or more 3D control parameters comprises a list of positional impulse responses (PIRs), a list of identifiers allowing to retrieve PIRs, a number of PIRs, a list of positions of PIRs, and/or a list of identifiers allowing to retrieve positions of PIRs.

10. The method of claim 1, wherein the one or more 3D control parameters comprises a list of positions of positional impulse responses (PIRs), and wherein the positions of PIRs are defined by one or more of an azimuth, an elevation and/or a distance.

11. The method of claim 1, wherein the one or more 3D control parameters comprise a gain, a delay, and/or a filter to be applied to a given virtual wave front associated with a given positional impulse response (PIR) generated by an audio engine.

12. The method of claim 1, wherein generating the 3D audio stream comprises generating three virtual wave fronts by selecting and/or positioning three positional impulse responses (PIRs) identified and/or positioned based on the one or more 3D control parameters.

13. The method of claim 1, further comprising creating the one or more 3D control parameters based on the audio stream.

14. The method of claim 13, wherein the creating the one or more 3D control parameters comprises selecting and adapting pre-existing 3D control parameters.

15. The method of claim 1, wherein the selecting the one or more 3D control parameters is based at least in part on a user input.

16. A computer-implemented system, the system comprising at least one processor and memory storing a plurality of executable instructions which, when executed by the at least one processor, cause the system to:
 access an audio stream;
 generate a feature vector associated with the audio stream by a Deep Neural Network (DNN) which takes for input the audio stream and which outputs the feature vector;
 select one or more 3D control parameters from a set of 3D control parameters, the selecting being based on the feature vector associated with the audio stream; and
 generate the 3D audio stream based on the selected one or more 3D control parameters.

17. A non-transitory computer-readable medium storing program instructions which upon being executed by a processor cause to perform:
 accessing an audio stream;
 generating a feature vector associated with the audio stream by a Deep Neural Network (DNN) which takes for input the audio stream and which outputs the feature vector;
 selecting one or more 3D control parameters from a set of 3D control parameters, the selecting being based on the feature vector associated with the audio stream; and
 generating the 3D audio stream based on the selected one or more 3D control parameters.

18. A method of controlling generation of a 3D audio stream, the method comprising:
 accessing an audio stream;
 generating a feature vector associated with the audio stream, wherein the feature vector comprises a metric associated with a frequency distribution of correlations of left and right channels of the audio stream;
 selecting, based on the feature vector associated with the audio stream, one or more 3D control parameters from a set of 3D control parameters; and
 generating the 3D audio stream based on the one or more 3D control parameters, wherein the frequency distribution of correlations of left and right channels of the audio stream is calculated based on the following equations:

$$\phi = \tan^{-1}\left(\frac{x_l}{x_r}\right)$$

$$\|x\| = \sqrt{x_l^2 + x_r^2}$$

$$\mathrm{corr}(x_l, x_r) = \phi\|x\|$$

wherein xl and xr are left and right channels sample values at a given time of the audio stream, Phi is the phase between the left and right channels, $\|x\|$ is a vector length of the feature vector and the correlation (corr) is a product of the phase and the vector length.

19. The method of claim 18, wherein the selecting the one or more 3D control parameters comprises accessing a database of 3D productions, each 3D production being associated with 3D control parameters specifically customized for a unique audio stream.

20. A computer-implemented system, the system comprising at least one processor and memory storing a plurality of executable instructions which, when executed by the at least one processor, cause the system to:
 generate a feature vector associated with an audio stream, wherein the feature vector comprises a metric associated with a frequency distribution of correlations of left and right channels of the audio stream;
 select, based on the feature vector associated with the audio stream, one or more 3D control parameters from a set of 3D control parameters; and
 generate a 3D audio stream based on the selected one or more 3D control parameters, wherein the frequency distribution of correlations of left and right channels of the audio stream is calculated based on the following equations:

$$\phi = \tan^{-1}\left(\frac{x_l}{x_r}\right)$$

$$\|x\| = \sqrt{x_l^2 + x_r^2}$$

$$\mathrm{corr}(x_l, x_r) = \phi\|x\|$$

wherein xl and xr are left and right channels sample values at a given time of the audio stream, Phi is the phase between the left and right channels, $\|x\|$ is a vector length of the feature vector and the correlation (corr) is a product of the phase and the vector length.

* * * * *